Jan. 3, 1967   A. TSCHURSCH   3,295,813
ADJUSTABLE BRACKET FOR SUPPORTING A WINDSHIELD
Filed Nov. 30, 1964
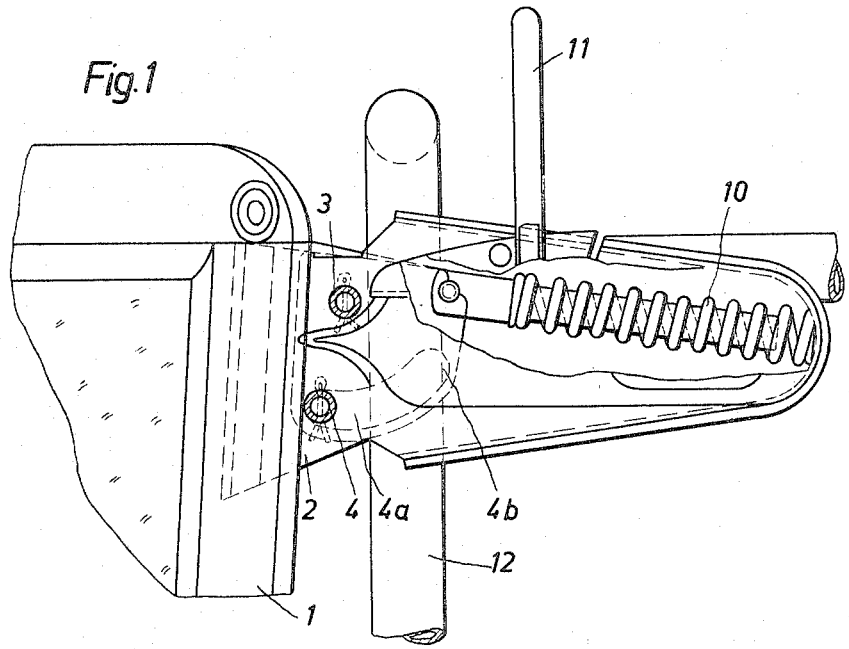
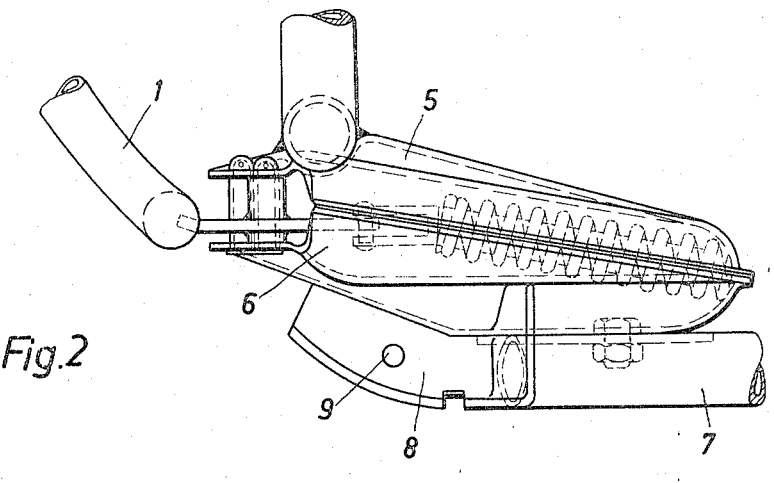
Inventor:
ARNOLD TSCHURSCH

United States Patent Office 3,295,813
Patented Jan. 3, 1967

3,295,813
ADJUSTABLE BRACKET FOR SUPPORTING
A WINDSHIELD
Arnold Tschursch, Heimatweg, Germany, assignor to Georg Fritzmeier, Kommanditgesellschaft, Grosshelfendorf above Munich, Germany, a firm of Germany
Filed Nov. 30, 1964, Ser. No. 414,693
7 Claims. (Cl. 248—291)

This invention relates to a central support for weatherproof covers, particularly for agricultural vehicles, for example motor vehicles, intended to protect the driver from weather conditions by the arrangement of said cover.

It is known to provide weatherproof covers, for example such as are used for agricultural motor vehicles, not only with a roof cover or skin which can be removed or folded up as required, but at the same time also to attach a pivotable windscreen to the roof structure. This windscreen, which may if desired have a wide-vision bowed or rounded shape, has an appreciable weight. For reasons of visibility this windscreen should be capable of being swung up far enough, or else mounted for that reason at a high enough level on the cover structure, as not to hinder the driver's vision when so swung up. For this reason it is necessary for the windscreen to be turned about an axis or about corresponding pivot points which however are so placed that the windscreen always has a downwardly directed force component when swung up, while yet being able to remain operatively secure in its swung up position.

At the same time, however, when in its swung down position the windscreen should satisfy the condition of bearing firmly against the side parts of the cover structure so as to give the fullest possible weather-tightness. The windscreen should also not have any tendency to jog to and fro under the effect of the movements of the vehicle.

Such firm supports for the pivotable windscreen in the two limit positions thereof, i.e. in the swung up position, on the one hand, and in the form of bearing against the side parts, on the other hand, may of course be obtained by the use of appropriately arranged spiral springs, rubber bands and cords. In practice, however, such means are wholly inadequate.

Accordingly, these weatherproof covers are greatly in need of a device for the pivoting mechanism of the windscreen which will not only fully meet the aforementioned problems but at the same time offer a compact arrangement, while moreover always functioning reliably in operation under the rough conditions of agricultural or building work.

The present invention provides for a central support for weatherproof covers, particularly for agricultural vehicles, in which are provided a bearing housing with a mounting for receiving the windscreen and a mounting for receiving a stop bolt, a bearing plate fitted to the windscreen having a curved longitudinal slot, and a recess for the engagement of a spring member supported in the bearing housing. The curved slot and the stop bolt for the same may also be changed over so that each is respectively in the other bearing plate.

According to the invention, the bearing housing may with particular advantage be composed of two parts, preferably an inner and an outer shell, thereby forming a body having good torsional rigidity. The two parts of the bearing housing may be joined together detachably or irremovably, for example by welding, screwing, rabbetting, riveting, fitting together, etc.

The spring member may furthermore engage by means of a forkhead in the cavity provided for the engagement of said spring member. The spring member may consist of a compression spring, possibly in association with a shock absorber, or a flat spring responsible to pressure. In the case of a shock absorber, this would be preferably a double-action hydraulic shock absorber or frictional shock absorber. Other spring elements which might be employed are a rubber block or a suitably shaped leaf spring, possibly with cams, etc., the adjustment being in each case effected so that the spring element works on pressure.

The outer shell half of the bearing housing may furthermore carry a mounting for a sleeve member which receives the roof frame and an abutment plate which limits the sliding movement of the roof frame, while this abutment plate may with special advantage carry the holder of the rearview mirror, preferably in a bore provided therefor, and a guide part for receiving the roof support.

The elements arranged inside the bearing housing, as they have been here described, and the parts disposed outside said housing and on the same, are so accommodated together, by reason of their extreme simplicity of construction and design, in a narrow space, namely in a central support of such small dimensions, that the entire device can be disposed at the upper front part of the roof frame. For the different operations, namely for holding the windscreen in a horizontal or in a vertical position, as the case requires, and for regulating the entire pivotal movement of the windscreen, and furthermore for the other parts which have an outside function, namely the rear-view mirror and roof support, only a small housing is necessary for their reception which may be designed in conformity with the elements to be arranged in and on the same.

Thus the housing may be made either in one part or in two or more parts, for example by welding, riveting, rabbetting, etc., for which a form of construction in synthetic plastic material is especially suitable.

It is important that the spring element should be so arranged inside the supporting housing as to act on pressure, that is to say on pressure both in the swung up position and in the closed position of the windscreen. The use of helical compression springs with or without internal guide means, for example by means of a rod or tube, or of plate springs working corresponding on pressure, is a matter of practical adaptation, while conventional shock absorbers can also be used in association therewith. The shape of the housing for the central support may for example depend on the particular use and form of construction of a special spring element.

The bearing housing is provided at its front end with the supporting bearing for the windscreen and with the supporting bearing for a stop bolt which permits the movement of the screen through a determined angular sector. A slot of suitable size is provided for this purpose in the bearing plate of the windscreen.

In the bearing plate of the bearing housing a cavity is also provided for holding the spring element which engages for example by means of a forkhead in the cavity. The pressure-responsive spring element may rest on the rear part of the bearing housing or if desired may be secured there.

The invention will be explained in further detail by way of example with reference to the accompanying drawings in which:

FIGURE 1 is a diagrammatic side view, in part cut away, of a particular form of construction of the central support according to the invention, and FIGURE 2 is a plan view of the arrangement according to FIGURE 1.

FIGURE 1 shows the windscreen or rather the frame 1 thereof. The windscreen 1 is connected with the bearing plate 2. 3 denotes the support of the windscreen, for example the axis about which the windscreen can be pivoted. This support 3 is arranged in a bearing plate provided for it that is in connection with the bearing housing. 4 denotes the means for limiting the angle of the windscreen, being in the form of an eccentric bolt mounted fixedly in the support provided in the bearing housing. 4a denotes a curved slot which determines the pivoting angle of the windscreen.

The bearing housing consists, for example, of an inner and an outer shell half (5, 6), as can best be seen from FIGURE 2. At 7 can be seen the sleeve member for receiving the roof frame, which is pushed into said sleeve. 8 denotes the abutment plate for said sleeve 7. On the outside of the bearing housing there may be arranged also a bore 9 for receiving the rear-view mirror and a means of holding the roof support 11.

Inside the bearing housing, in this exemplified embodiment of the invention, the spring element is designated by 10, here for example in the form of a spiral compression spring containing internal guide means. This spring element is for example articulated to the bearing plate of the windscreen by means of a forkhead.

The actual supporting frame of the cover as a while is denoted by 12.

The mode of operation of the device according to the invention follows from the arrangement of the spring element, working under pressure, in conjunction with the element for the pivoting of the windscreen. When the windscreen, which is rotatable about the support 3, is hanging down, such a lever effect is exerted by the spring element 10 on the bearing plate carrying the windscreen that said windscreen or the frame 1 thereof has a firm hold on the stop bolt (eccentric bolt) 4. To the extent to which the windscreen is raised in a forwardly directed pivoting movement, rotating about the support 3, so the curved slot 4a slides along the support or stop bolt 4, while owing to the rigid associated movement of the bearing plate 2 attached to the windscreen the spring element 10 is at the same time moved therewith. In the exemplified form of construction according to FIGURE 1, the compressive tension of the spring element 10 is so dimensioned that in the swung-up position of the windscreen, when the end of the curved slot is at the stop bolt 4, the spring element 10 exerts an additional pressure essentially in the direction of the upwardly tilted windscreen, so that as a result of the corresponding leverage on the bearing plate 2 and about the windscreen support 3 as axis of rotation, the windscreen is held in this upwardly tilted position. The forces exerted by the spring element 10 working on pressure are so brought into conformity with the weight of the windscreen as to balance out the weight and yet the necessary forces are respectively exerted by the spring element for holding the windscreen either in the swung-up position or in the hanging down position in which it is pressed against the side parts. For this purpose, leaf springs with suitable cam arrangements may also be used, furthermore additional shock absorbers incorporated, and so forth.

On the outer half-shell of the bearing housing is also the mounting for a sleeve 7 which receives the roof frame. The sleeve which receives the front part of the roof frame meets with an abutment plate 8 which carries in a suitable bore provided for the purpose the rear-view mirror holder and a guide part for receiving the roof support.

The central support according to the invention in practical application affords the substantial advantage that in this suspension means is simultaneously accommodated the spring element acting both for overcoming the weight of the windscreen in its swung-up position and for producing the necessary tension of the windscreen in bearing against the stop bolt 4. At the same time, on this structurally very simple suspension means the roof frame can be rotatably mounted and both a roof support and the rear-view mirror fastened thereto. The structure of a cover as a whole is thereby much simplified, as these components essential to the operation and secure functioning of the cover can be compactly prefabricated and subsequently incorporated.

What I claim is:

1. In an assembly of a weather protection member and a windscreen member for an agricultural vehicle or the like a windscreen support adapted for attachment to a portion of the weather protection member, said windscreen support comprising mating halves which when joined form a spring housing with a rearwardly closed end and a forward open end, said halves each terminating at the open end with a flattened lip, between said lips a bearing plate fitted to said windscreen and pivotally mounted upon a pin extending between the lips, travel-limiting stop means associated with the bearing plate and the lips to limit pivotal motion of the bearing plate, and a compression spring member extending between the bearing plate and the rearwardly closed end of the housing acting to retain the bearing plate in desired position.

2. The device of claim 1 in which the travel-limiting stop means comprises an arcuate slot in one member and a pin mounted upon the other member and fitting in said slot.

3. The device of claim 2 in which attachment means for portions of the weather protection assembly are affixed to the spring housing to provide a central support for such portions.

4. The device of claim 1 in which attachment means for the portions of the weather protection assembly are affixed to the spring housing to provide a central support for such portions.

5. The device of claim 4 in which the attachment means comprises a sleeve that receives a roof frame member and an abutment plate that limits the sliding movement of the roof frame member.

6. The device of claim 4 in which means are provided to carry a rear view mirror holder and a guide part for the roof support.

7. The device of claim 1 in which the compression spring member is mounted upon a bar connected by a forked hinge to the bearing plate, said bar being of such length that a spiral compression spring mounted thereon is supported by the rearwardly closed end of the housing.

References Cited by the Examiner
UNITED STATES PATENTS

| 1,556,902 | 10/1925 | Beville et al. | 296—95 |
| 2,623,236 | 12/1952 | Borchers et al. | 16—135 |

FOREIGN PATENTS 204,493  5/1939  Switzerland.

CLAUDE A. LE ROY, *Primary Examiner.*

J. F. FOSS, *Assistant Examiner.*